US010135708B2

(12) United States Patent
Dinan et al.

(10) Patent No.: US 10,135,708 B2
(45) Date of Patent: Nov. 20, 2018

(54) TECHNOLOGIES FOR PERFORMANCE INSPECTION AT AN ENDPOINT NODE

(71) Applicant: Intel Corporation, Santa Clara, CA (US)

(72) Inventors: James Dinan, Hudson, MA (US); David Keppel, Seattle, WA (US)

(73) Assignee: Intel Corporation, Santa Clara, CA (US)

( * ) Notice: Subject to any disclaimer, the term of this patent is extended or adjusted under 35 U.S.C. 154(b) by 236 days.

(21) Appl. No.: 14/866,536

(22) Filed: Sep. 25, 2015

(65) Prior Publication Data

US 2017/0093670 A1   Mar. 30, 2017

(51) Int. Cl.
*G06F 15/173* (2006.01)
*H04L 12/26* (2006.01)
*H04L 29/08* (2006.01)

(52) U.S. Cl.
CPC .......... *H04L 43/0876* (2013.01); *H04L 43/10* (2013.01); *H04L 67/10* (2013.01)

(58) Field of Classification Search
CPC ...... H04L 43/0876; H04L 43/10; H04L 67/10
USPC ....................................................... 709/224
See application file for complete search history.

(56) References Cited

U.S. PATENT DOCUMENTS

| | | | | |
|---|---|---|---|---|
| 7,088,706 | B2 * | 8/2006 | Zhang | H04L 43/00 370/352 |
| 8,401,517 | B1 * | 3/2013 | Levine | H04L 41/142 455/405 |
| 2003/0115321 | A1 | 6/2003 | Edmison | |
| 2010/0150009 | A1 | 6/2010 | Mangs | |
| 2010/0169719 | A1 * | 7/2010 | Carruzzo | H04L 43/026 714/49 |
| 2011/0249572 | A1 * | 10/2011 | Singhal | H04L 41/069 370/252 |
| 2012/0233308 | A1 * | 9/2012 | Van De Houten | H04L 43/12 709/224 |
| 2013/0117434 | A1 | 5/2013 | Chakrabarti | |

(Continued)

OTHER PUBLICATIONS

International Search Report for PCT/US16/048682, dated Dec. 9, 2016 (3 pages).

(Continued)

*Primary Examiner* — Wing F Chan
*Assistant Examiner* — Joseph R Maniwang
(74) *Attorney, Agent, or Firm* — Barnes & Thornburg LLP

(57) ABSTRACT

Technologies for monitoring communication performance of a high performance computing (HPC) network include a performance probing engine of a source endpoint node of the HPC network. The performance probing engine is configured to generate a probe request that includes a timestamp of the probe request and transmit the probe request to a destination endpoint node of the HPC network communicatively coupled to the source endpoint node via the HPC network. The performance probing engine is additionally configured to receive a probe response from the destination endpoint node via the HPC network and to generate another timestamp that corresponds to the probe request having been received. Further, the performance probing engine is configured to determine a round-trip latency as a function of the probe request and probe response timestamps. Other embodiments are described and claimed.

25 Claims, 6 Drawing Sheets

(56) References Cited

U.S. PATENT DOCUMENTS

2013/0201858 A1    8/2013  Varma et al.
2015/0138979 A1    5/2015  Iijima et al.
2015/0288671 A1*  10/2015  Chan .................. H04L 63/0227
                                                              726/1

OTHER PUBLICATIONS

Written Opinion for PCT/US16/048682, dated Dec. 9, 2016 (8 pages).

* cited by examiner

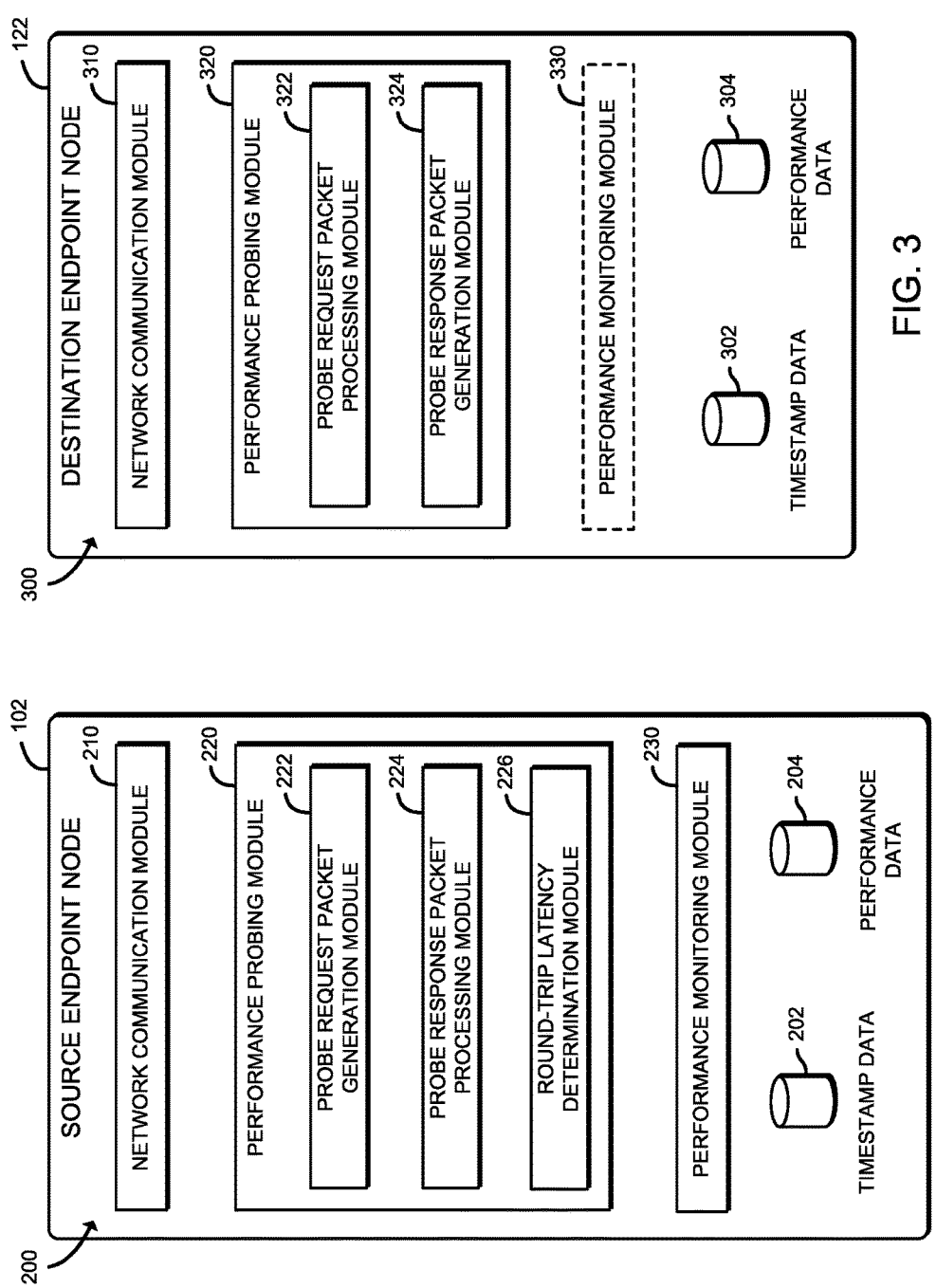

TECHNOLOGIES FOR PERFORMANCE INSPECTION AT AN ENDPOINT NODE

GOVERNMENT RIGHTS CLAUSE

This invention was made with Government support under contract number H98230-13-D-0124 awarded by the Department of Defense. The Government has certain rights in this invention.

BACKGROUND

Network operators and communication service providers typically rely on complex, large-scale computing environments, such as high-performance computing (HPC) and cloud computing environments. Due to the complexities associated with such large-scale computing environments, communication performance issues in such HPC systems can be difficult to detect and correct. This problem can be more difficult for performance anomalies (e.g., incast), which can result from the dynamic behavior of an application running on the system or the behavior of the system itself. For example, partitioned global address space (PGAS) applications that perform global communication at high message rates can incur network congestion that may be exacerbated by system noise, which may result in performance degradation.

Performance measurement techniques may rely on various metrics (e.g., timing sections of code) combined with hypothesis testing. For example, if code interacts with the network, such timing can reveal attributes of network behavior. However, HPC system networks achieve higher performance in part by decoupling software actions (e.g., requesting a message be sent) from network hardware actions (e.g., sending the message). As such, the utility of such software approaches can have a negative impact. A further complication is higher performance is typically achieved with higher message rates, which increases the overhead of approaches based on per-message code measurement.

Performance measurement may also rely on network probing technologies (e.g., ping, traceroute, etc.). These approaches have been developed for large-scale networks with relatively low message rates at each endpoint, and, often, with relatively large messages. HPC networks typically have dramatically higher message rates and sub-microsecond latencies. Applying prior technologies in a straightforward way can dramatically increase overheads. This, in turn, requires specialized measurement techniques to avoid introducing system noise and to capture high-fidelity measurements. In some cases, a lack of network hardware support can lead to higher rates of expensive software processing; while in other cases, the lack of hardware support may lead to data simply not being available. For example, HPC networks often do not provide any mechanism by which to examine the path taken by a specific message packet.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

FIG. 2 is a simplified block diagram of at least one embodiment of the source endpoint node of the system of FIG. 1;

FIG. 3 is a simplified block diagram of at least one embodiment of the destination endpoint node of the system of FIG. 1;

DETAILED DESCRIPTION OF THE DRAWINGS

Figure 1:
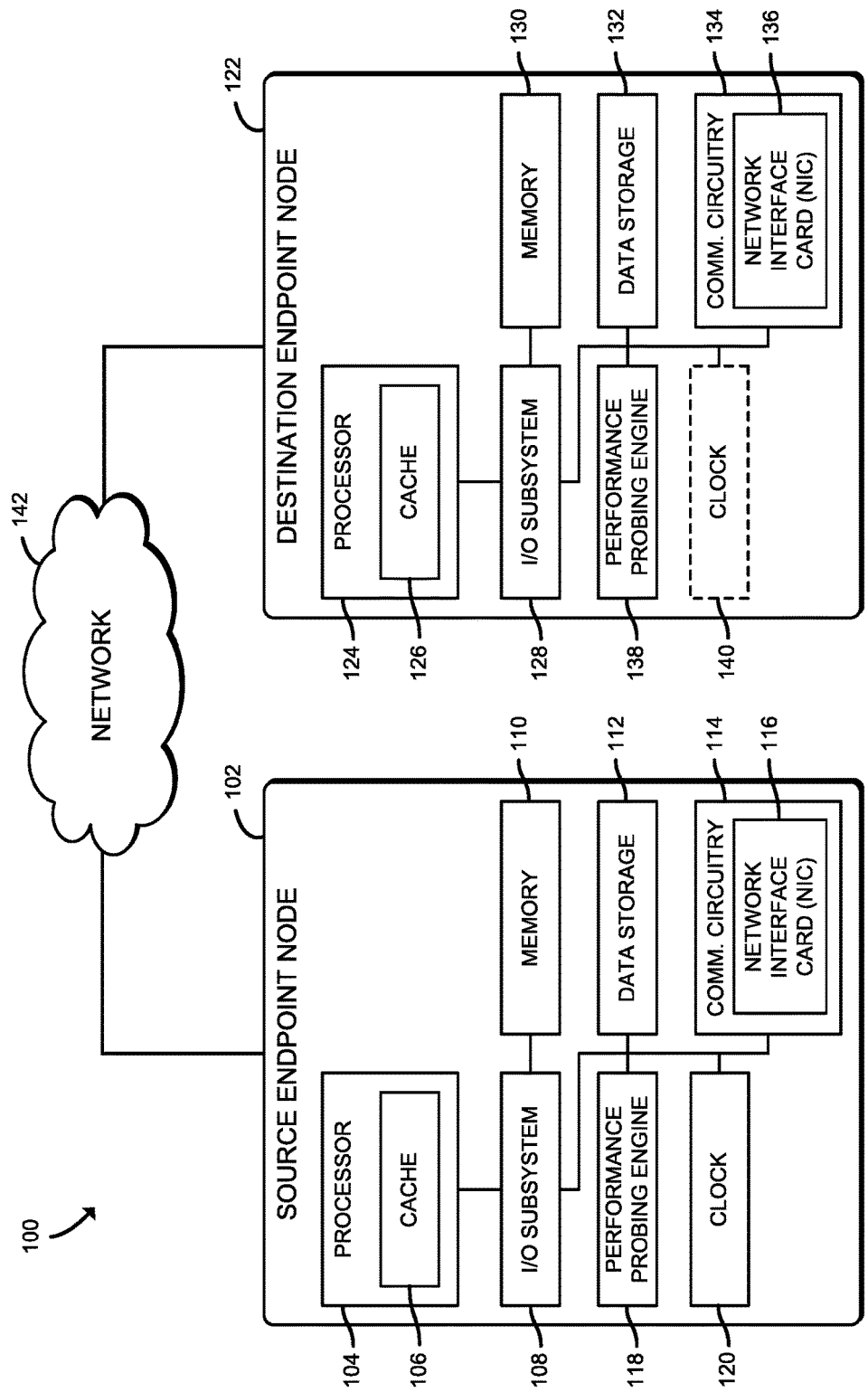
FIG. 1 is a simplified block diagram of at least one embodiment of a system for monitoring communication performance of a high performance computing (HPC) network that includes a source endpoint node communicatively coupled over the HPC network with a destination endpoint node.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one of A, B, and C" can mean (A); (B); (C): (A and B); (A and C); (B and C); or (A, B, and C). Similarly, items listed in the form of "at least one of A, B, or C" can mean (A); (B); (C): (A and B); (A and C); (B and C); or (A, B, and C).

The disclosed embodiments may be implemented, in some cases, in hardware, firmware, software, or any combination thereof. The disclosed embodiments may also be implemented as instructions carried by or stored on one or more transitory or non-transitory machine-readable (e.g., computer-readable) storage media (e.g., memory and/or data storage devices), which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Referring now to FIG. 1, in an illustrative embodiment, a system 100 for monitoring communication performance of a high performance computing (HPC) network (e.g., HPC network 142) includes a source endpoint node 102 and a destination endpoint node 122 communicatively coupled over the HPC network 142. In use, the source endpoint node 102 transmits a network packet to the destination endpoint node 122, and receives another network packet from the destination endpoint node 122 in response to the transmitted network packet. Prior to the source endpoint node 102 transmitting the network packet, the source endpoint node 102 generates a timestamp, which may be saved locally or included with the network packet to be transmitted to the destination endpoint node 122. In such embodiments wherein the timestamp is not stored locally, the response network packet from the destination endpoint node 122 also includes the timestamp. Upon receipt of the response network packet from the destination endpoint node 122, the source endpoint node 102 generates another timestamp and retrieves the initial timestamp (e.g., from local storage or the response network packet, depending on where the initial timestamp was stored).

As discussed in detail below, based on a comparison of the timestamps, the source endpoint node 102 can determine a round-trip latency that may be used to identify other endpoint computing devices (e.g., the destination endpoint node 122) that may be at the source of the congestion (e.g., due to a translation lookaside buffer (TLB) miss, an incast at the destination endpoint node 122, etc.). Accordingly, unlike traditional probing technologies that rely on intermediate switches of the HPC network 142 to manage congestion, the source endpoint node 102 can take measures to resolve the congestion locally (e.g., throttle message injection, load balancing across network planes, application-level code updates, etc.).

Further, it should be appreciated that traditional probing technologies can interfere with applications running on the computing device analyzing the data monitored by the probe. For example, such application interfering probing technologies typically incorporate a host processor and change the state of the computing device analyzing the data monitored by the probe (e.g., alter memory, run additional software, or otherwise disturb application behavior). Unlike such traditional probing technologies, the source endpoint node 102 and the destination endpoint node 122 each include a performance probing engine 118, discussed in further detail below, which is configured to perform passive probing to determine the round-trip latency while application behavior can remain undisturbed. In other words, the probing of the HPC network 142 can be offloaded to the performance probing engine 118 prior to software being executed for network packet processing during the probe request generation and probe response processing phases. As such, when the source endpoint node 102 receives the response network packet at a network interface (e.g., network interface controller (NIC) 116) of the source endpoint node 102, system level software may not need to be invoked and the state of the source endpoint node 102 can remain unchanged. As a result, more accurate measurements in high-throughput patterns, as opposed to typical internet network probing technologies that involve a processor (e.g., processor 104) of the source endpoint node 102. Further, queuing delays may be isolated at the source endpoint node 102, without distortions introduced by delays between hardware and software, when they interact.

Additionally, offloading the probing of the HPC network 142 to the performance probing engine 118 may enable timing measurements to be performed at locations that are close to actual egress and ingress points. Unlike traditional HPC network performance data aggregation that occurs at each intermediate switch and endpoint, offloading the probing of the HPC network 142 can additionally allow for live feedback to be received at the source endpoint node 102. Accordingly, the source endpoint node 102 can identify specific peer endpoint nodes (e.g., the destination endpoint node 122) that may be the source of network congestion (e.g., due to a TLB miss or incast at one of the peer endpoint nodes) and take action at the source endpoint node 102, rather than any intermediate switches, to manage a congested network. Such performance feedback may be critical to application developers for detecting transient or repeating performance anomalies (e.g., transient incast communication patterns).

The source endpoint node 102 may be embodied as any type of computation or computer device capable of performing the functions described herein, including, without limitation, a server (e.g., stand-alone, rack-mounted, blade, etc.), a network appliance (e.g., physical or virtual), a web appliance, a distributed computing system, a processor-based system, a multiprocessor system, a smartphone, a mobile computing device, a tablet computer, a laptop computer, a notebook computer, and/or a computer.

The illustrative source endpoint node 102 includes a processor 104, an input/output (I/O) subsystem 108, a memory 110, a data storage device 112, communication circuitry 114, the performance probing engine 118, and a clock 120. Of course, in other embodiments, the source endpoint node 102 may include other or additional components, such as those commonly found in a computing device (e.g., input/output devices, etc.). Additionally, in some embodiments, one or more of the illustrative components may be incorporated in, or otherwise form a portion of, another component. For example, in some embodiments, the memory 110, or portions thereof, may be incorporated in the processor 104.

The processor 104 may be embodied as any type of processor capable of performing the functions described herein. The processor 104 may be embodied as a single or multi-core processor(s), digital signal processor, microcontroller, or other processor or processing/controlling circuit. The I/O subsystem 108 may be embodied as circuitry and/or components to facilitate input/output operations with the processor 104, the memory 110, and other components of the source endpoint node 102. For example, the I/O subsystem 108 may be embodied as, or otherwise include, memory controller hubs, input/output control hubs, integrated sensor hubs, firmware devices, communication links (i.e., point-to-point links, bus links, wires, cables, light guides, printed circuit board traces, etc.) and/or other components and subsystems to facilitate the input/output operations. In some embodiments, the I/O subsystem 108 may form a portion of a system-on-a-chip (SoC) and be incorporated, along with the processor 104, the memory 110, and other components of the source endpoint node 102, on a single integrated circuit chip.

The illustrative source endpoint node 102 includes a cache memory 106 that may be embodied as an on-die cache, or an on-processor cache. In some embodiments, the cache memory 106 may be embodied as any type of cache memory that the processor 104 of the source endpoint node 102 can access more quickly than the memory 110. For example, in some embodiments, the cache memory 106 may be an off-die cache, but reside on the same SoC as the processor 104.

The memory 110 may be embodied as any type of volatile or non-volatile memory or data storage capable of performing the functions described herein. In operation, the memory 110 may store various data and software used during operation of the source endpoint node 102 such as operating systems, applications, programs, libraries, and drivers. The memory 110 is communicatively coupled to the processor 104 via the I/O subsystem 108, which may be embodied as circuitry and/or components to facilitate input/output operations with the processor 104, the memory 110, and other components of the source endpoint node 102. For example, the I/O subsystem 108 may be embodied as, or otherwise include, memory controller hubs, input/output control hubs, integrated sensor hubs, firmware devices, communication links (i.e., point-to-point links, bus links, wires, cables, light guides, printed circuit board traces, etc.) and/or other components and subsystems to facilitate the input/output operations. In some embodiments, the I/O subsystem 108 may form a portion of a system-on-a-chip (SoC) and be incorporated, along with the processors 104, the memory 110, and other components of the source endpoint node 102, on a single integrated circuit chip.

The data storage device 112 may be embodied as any type of device or devices configured for short-term or long-term storage of data such as, for example, memory devices and circuits, memory cards, hard disk drives, solid-state drives, or other data storage devices. The data storage device 112 may include a system partition that stores data and firmware code for the source endpoint node 102. The data storage device 112 may also include an operating system partition that stores data files and executables for an operating system of the source endpoint node 102. The memory 110 and/or the data storage device 112 (e.g., the computer-readable storage media) may store various data as described herein, including operating systems, applications, programs, libraries, drivers, instructions, etc., capable of being executed by a processor (e.g., the processor 104) of the source endpoint node 102.

The communication circuitry 114 may be embodied as any communication circuit, device, or collection thereof, capable of enabling communications over the HPC network 142 between the source endpoint node 102 and the destination endpoint node 122. The communication circuitry 114 may be configured to use any one or more communication technologies (e.g., wired and/or wireless communication technologies) and associated protocols (e.g., Ethernet, Bluetooth®, Wi-Fi®, WiMAX, etc.) to effect such communication.

The communication circuitry 114 illustratively includes a network interface controller (NIC) 116. The NIC 116 may be embodied as one or more add-in-boards, daughtercards, network interface cards/controllers, controller chips, chipsets, or other devices that may be used by the source endpoint node 102. For example, the NIC 116 may be embodied as an expansion card coupled to the I/O subsystem 108 over an expansion bus (e.g., PCI Express), part of an SoC that includes one or more processors, or included on a multichip package that also contains one or more processors. Additionally or alternatively, functionality of the NIC 116 may be integrated into one or more components of the source endpoint node 102 at the board level, socket level, chip level, and/or other levels. The NIC 116 is configured to function as the interface between the communication circuitry 114 and the HPC network 142 (e.g., switches, routers, access points, etc.).

The performance probing engine 118 may be embodied as any hardware component(s) and/or circuitry capable of performing the functions described herein. Accordingly, as shown in FIG. 1, the performance probing engine 118 may be connected to one or more memory and/or data storage devices (i.e., computer-readable storage media), as well as one or more processors capable executing instructions stored on the memory and/or data storage devices. The performance probing engine 118 is configured to monitor communication performance of a network (e.g., the HPC network 142) by determining a round-trip latency of a network communication (e.g., a network flow). To do so, the performance probing engine 118 is configured to generate a timestamp upon transmission of a probe request sent to another endpoint node (e.g., the destination endpoint node 122) and another timestamp in response to reception of a probe response received from the other endpoint node (e.g., the destination endpoint node 122). Accordingly, the timestamps can be compared and the round-trip latency can be determined and used to determine one or more performance characteristics of the HPC network 142, which will be described in further detail below. It should be appreciated that, in some embodiments, the performance probing engine 118 may be a hardware component of the NIC 116. It should be further appreciated that, in some embodiments, at least a portion of the performance probing engine 118 may be embodied as software executable by the NIC 116.

The clock 120 may be embodied as any hardware component(s) or circuitry capable of generating a timestamp corresponding to a present time of the clock and otherwise performing the functions described herein. For example, in the illustrative embodiment, the clock 120 may be implemented via an on-chip oscillator. It should be appreciated that, in some embodiments, a present time may be determined using an external set of signals and/or an internal device that can be fully or partially synchronized with one or more external signals. For example, in some embodiments, the clock 120 may be shared (e.g., multiple distributed clocks being generally synchronized using a synchronization protocol).

Similar to the illustrative source endpoint node 102, the illustrative destination endpoint node 122 includes a processor 124 with a cache 126, an input/output (I/O) subsystem 128, a memory 130, a data storage device 132, communication circuitry 134 that includes a NIC 136, a performance probing engine 138, and, in some embodiments, a clock 140. Of course, in other embodiments, the destination endpoint node 122 may include other or additional components, such as those commonly found in a computing device (e.g., input/output devices, etc.). As such, further descriptions of the like components are not repeated herein for clarity of the description with the understanding that the description of the corresponding components provided above in regard to the source endpoint node 102 applies equally to the corresponding components of the destination endpoint node 122.

The HPC network 142 may be embodied as any type of HPC network architecture capable of high-speed, low-latency interconnectivity, such as a cluster computing network architecture and/or a grid computing network architecture (e.g., a fabric computing network architecture). Accordingly, the HPC network 142 may include additional computing devices (i.e., networking devices), physical and/or virtual, that may be commonly found in networks, such as servers, switches, routers, access points, network controllers, etc.

Referring now to FIG. 2, in use, the source endpoint node 102 establishes an environment 200 during operation. The illustrative environment 200 includes a network communication module 210, a performance probing module 220, and a performance monitoring module 230. Each of the modules, logic, and other components of the environment 200 may be embodied as hardware, software, firmware, or a combination thereof. For example, each of the modules, logic, and other components of the environment 200 may form a portion of, or otherwise be established by, the processor 104, the performance probing engine 118, and/or other hardware components of the source endpoint node 102. As such, in some embodiments, one or more of the modules of the environment 200 may be embodied as circuitry or a collection of electrical devices (e.g., network communication circuitry 210, performance probing circuitry 220, performance monitoring circuitry 230, etc.). In the illustrative environment 200, the source endpoint node 102 includes timestamp data 202 and performance data 204, each of which may be accessed by the various modules and/or sub-modules of the source endpoint node 102. It should be appreciated that the source endpoint node 102 may include other components, sub-components, modules, sub-modules, and/or devices commonly found in a computing device, which are not illustrated in FIG. 2 for clarity of the description.

The network communication module 210 is configured to facilitate inbound and outbound network communications (e.g., network traffic, network packets, network flows, etc.) to and from the source endpoint node 102. To do so, the network communication module 210 is configured to prepare and transmit network packets to other endpoint nodes (e.g., the destination endpoint node 122). Further, the network communication module 210 is configured to receive and process network packets from the other endpoint nodes (e.g., the destination endpoint node 122). Accordingly, in some embodiments, at least a portion of the functionality of the network communication module 210 may be performed by the communication circuitry 114, and more specifically by the NIC 116.

The performance probing module 220 is configured to monitor communication performance of a network (e.g., the HPC network 142) by determining a round-trip latency of a network communication (e.g., a network flow) using timestamps generated upon transmission of a probe request sent to another endpoint node (e.g., the destination endpoint node 122) and in response to reception of a probe response received from the other endpoint node (e.g., the destination endpoint node 122). It should be appreciated that at least of the functionality of the performance probing module 220 as described herein may be performed by the performance probing engine 118.

To monitor the communication performance of the network 142, the performance probing module 220 includes a probe request packet generation module 222, a probe response packet processing module 224, and a round-trip latency determination module 226. The probe request packet generation module 222 is configured to generate the probe request. In some embodiments, the generation of the probe request may result in a new network packet being generated for transmission. In other words, the probe request network packet may be used only for performance monitoring. Alternatively, in some embodiments, the generated probe request may be included with (e.g., added to header, payload, message, etc.) an existing network packet queued for transmission from the source endpoint node 102. In other words, the probe request may piggyback on existing network communication traffic.

The probe request packet generation module 222 is further configured to generate a timestamp using a clock (e.g., the clock 120 of FIG. 1), such that the timestamp corresponds to substantially the time in which the probe request packet is to be transmitted from the source endpoint node 102 (e.g., via the network communication module 210). In some embodiments, the timestamp may be saved in local storage (e.g., the cache 106 or the memory 110 of FIG. 1). In such embodiments, the timestamp may be saved in the timestamp data 202.

The probe request packet generation module 222 may be additionally configured to generate an identifier of the probe request (e.g., an end-to-end reliability sequence number) that can be used to identify the probe response received by the source endpoint node 102 from the destination endpoint node 122 that was received in response to the probe request. In some embodiments, the identifier may be saved in local storage (e.g., the cache 106 or the memory 110 of FIG. 1) along with the timestamp (e.g., in the timestamp data 202). In such embodiments, the identifier may be used as a key to identify the timestamp (e.g., a key-value pair). Additionally or alternatively, the timestamp and/or the identifier of the probe request may be included with the probe request (e.g., in a header, message, payload, etc.) such that the timestamp and/or the identifier may be included with the probe response (e.g., in a header, message, payload, etc.).

The probe request packet generation module 222, in some embodiments, may be configured to include local performance metadata of the source endpoint node 102 within the probe response. In such embodiments, the probe request packet generation module 222 may retrieve the local performance metadata from the performance data 204, for example. Additionally or alternatively, in some embodiments, the probe request packet generation module 222 may be configured to include a performance metadata request within the probe request, such that the destination endpoint node 122 can respond with remote performance metadata of the destination endpoint node 122 upon receipt of the performance metadata request. The local and/or remote performance metadata may include any data indicative of a performance level of the endpoint node for which the performance metadata corresponds, such as power consumption, bandwidth, throughput, latency, etc.

The probe response packet processing module 224 is configured to generate another timestamp in response to having received the probe response. The probe response packet processing module 224 is further configured to retrieve the initial timestamp generated by the probe request packet generation module 222, the location of which depends on where the initial timestamp was stored (i.e., in local storage or within the probe response). In embodiments wherein the initial timestamp was stored in local storage but the initial timestamp is no longer located in the local storage (e.g., the timestamp was evicted), the probe response packet processing module 224 may be configured to drop the probe response without performing further processing (e.g., due to the probe response having gotten stale) and/or increment an over-time counter that indicates an attempt to retrieve a timestamp was unsuccessful. Accordingly, historical values of the over-time counter at any given time may be used to determine performance characteristics of the HPC network 142, which are described below. It should be appreciated that, in some embodiments, more than one over-time counter may be generated and each over-time counter may correspond to one or more endpoint nodes of which are capable of network communication with the source endpoint node 102. Accordingly, in such embodiments, the over-time counter may be further use in determining a point or points of congestion in the HPC network 142.

As described previously, the destination endpoint node 122 can include remote performance metadata of the destination endpoint node 122 (i.e., remote relative to the source endpoint node 102) in response to receipt of a performance metadata request included in the probe request. Accordingly, in such embodiments, the probe response packet processing module 224 may be configured to retrieve the remote performance metadata of the destination endpoint node 122. Additionally, in some embodiments, the probe response packet processing module 224 may be configured to store the retrieved remote performance metadata in the performance data 204.

The round-trip latency determination module 226 is configured to determine a round-trip latency of the HPC network 142 (i.e., an amount of time it takes a network packet to travel to and from two components of the HPC network 142) by comparing the initial timestamp corresponding to the probe request and the subsequent timestamp corresponding to the probe response that was received in response to the probe request. To do so, the round-trip latency determination module 226 may be configured to subtract the probe request generated timestamp from the probe response generated timestamp, resulting in the round-trip latency.

The performance monitoring module 230 is configured to determine one or more performance characteristics of the HPC network 142 based on the round-trip latency. The performance characteristics may be embodied as any type of data indicative of a measurement, value, or indication of a quality of a network feature of the HPC network 142. For example, the performance characteristics may be related to throughput, latency, etc., such that they can be used by the source endpoint node 102 to identify a degradation of a performance level of the HPC network 142. The degradation of the performance level may include an observed bottleneck (i.e., HPC network 142 performance can be improved by reducing the load that leads to the bottleneck), or a detected absence of bottlenecks (e.g., indicating that a higher load can be sustained without introducing a bottleneck). Accordingly, the performance metrics can be used by the source endpoint node 102 to determine one or more remedial actions to resolve detected latency, congestion, incast, convoying problems, and/or other network health related issue of the HPC network 142. Such remedial actions may include temporarily throttling message injection to a particular endpoint node, load balancing across network planes, application-level code updates, etc.

Referring now to FIG. 3, in use, the destination endpoint node 122 establishes an environment 300 during operation. The illustrative environment 300 includes a network communication module 310 and a performance probing module 320. Each of the modules, logic, and other components of the environment 300 may be embodied as hardware, software, firmware, or a combination thereof. For example, each of the modules, logic, and other components of the environment 300 may form a portion of, or otherwise be established by, the processor 124 or other hardware components of the destination endpoint node 122. As such, in some embodiments, one or more of the modules of the environment 300 may be embodied as circuitry or collection of electrical devices (e.g., network communication circuitry 310, performance probing circuitry 320, etc.). In the illustrative environment 300, the destination endpoint node 122 includes timestamp data 302 and performance data 304, each of which may be accessed by the various modules and/or sub-modules of the destination endpoint node 122. It should be appreciated that the destination endpoint node 122 may include other components, sub-components, modules, sub-modules, and/or devices commonly found in a computing device, which are not illustrated in FIG. 3 for clarity of the description.

The network communication module 310 is configured to facilitate inbound and outbound network communications (e.g., network traffic, network packets, network flows, etc.) to and from the destination endpoint node 122. To do so, the network communication module 210 is configured to receive and process network packets from other endpoint nodes (e.g., the source endpoint node 102). Further, the network communication module 310 is configured to prepare and transmit network packets to the other endpoint nodes (e.g., the source endpoint node 102). Accordingly, in some embodiments, at least a portion of the functionality of the network communication module 310 may be performed by the communication circuitry 134, and more specifically by the NIC 136.

The performance probing module 320 is configured to process probe requests received from other endpoint nodes (e.g., the source endpoint node 102). To process a received probe request, the performance probing module 320 includes a probe request packet processing module 322 and a probe response packet generation module 324. The probe request packet processing module 322 is configured to process the probe request. As described previously, the probe request may be a designated probe request network packet or piggyback (i.e., be included within) an existing network packet intended to be sent to the destination endpoint node 122. Accordingly, the probe request packet processing module 322 is configured to determine whether the probe request is piggybacking another network packet or is the purpose of the network packet.

As described previously, in some embodiments, the probe request may include a timestamp, an identifier of the probe request, and/or local performance metadata of the source endpoint node 102. In such embodiments, the probe request packet processing module 322 may be configured to retrieve the data stored within the probe request and store the data locally or include the data in the probe response. For example, the probe request packet processing module 322 may extract the timestamp and/or the identifier and store the timestamp in the timestamp data 302 such that it can be retrieved and included in the probe response. In another example, the probe request packet processing module 322 may extract the local performance data (i.e., local relative to the source endpoint node 102) and store the local performance data in the performance data 304. Accordingly, the destination endpoint node 122 may use the local performance data to determine one or more performance characteristics of the HPC network 142.

The probe response packet generation module 324 is configured to generate a probe response based on a determination by the probe request packet processing module 322 as to whether the probe request is piggybacking another network packet or is the purpose of the network packet. If the probe request is piggybacking the existing network packet, the probe response packet generation module 324 may be configured to generate a response network packet (e.g., an acknowledgement network packet) and include the probe response within the response network packet. Alternatively, if network packet is to serve only as the probe request, the probe response packet generation module 324 may be configured to generate a response network packet to serve only as the response packet.

As described previously, the timestamp of the probe request and/or the identifier of the probe request may be included in the probe request (e.g., in a header, message, payload, etc.). Accordingly, in such embodiments, the probe response packet generation module 324 may be configured to retrieve the timestamp and/or the identifier from the probe request and include the timestamp and/or the identifier in the probe response. As also described previously, in some embodiments, the probe request may include a performance metadata request. In such embodiments, the probe request packet processing module 322 may be configured to retrieve the remote performance metadata of the destination endpoint node 122 (i.e., remote relative to the source endpoint node 102) and include the remote performance metadata in the probe response. In some embodiments, the performance metadata may be retrieved from the performance data 304.

The destination endpoint node 122, in some embodiments, may include a clock (e.g., the clock 140). In such embodiments, the probe response packet generation module 324 may be further configured to generate another timestamp using the clock 140, which may be included in the probe response and/or stored local to the destination endpoint node 122 (e.g., in the timestamp data 302).

In some embodiments, the destination endpoint node 122 may additionally include a performance monitoring module 330. In such embodiments, similar to the performance monitoring module 230 of the source endpoint node 102 of FIG. 2, the performance monitoring module 330 may be configured to determine one or more performance characteristics of the HPC network 142, such as may be determined based on the local performance data that may be included in the probe request and/or the remote performance data of the destination endpoint node 122.

Figure 4:
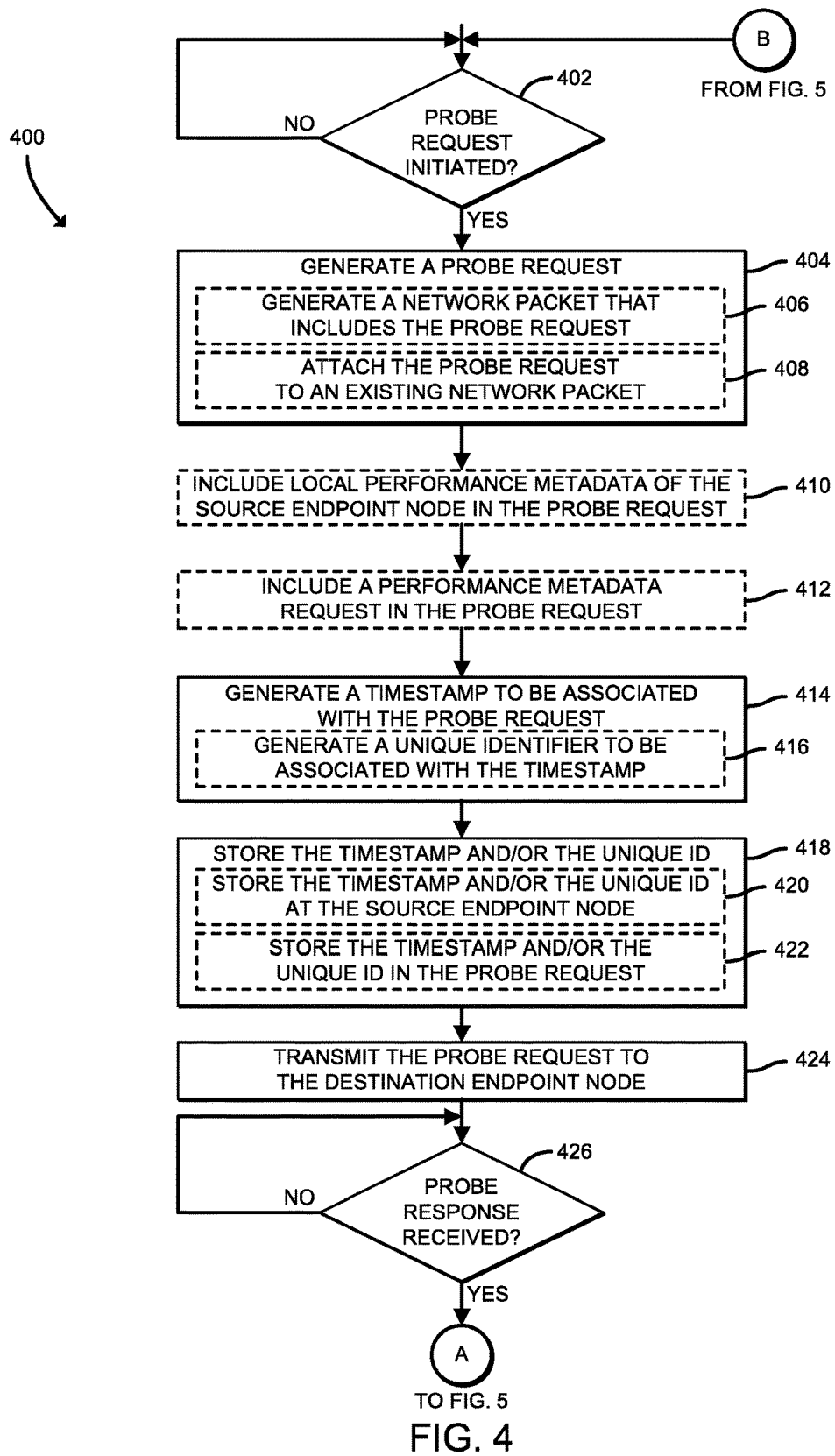
FIGS. 4 and 5 are a simplified flow diagram of at least one embodiment of a method for monitoring communication performance of the HPC network that may be executed by the source endpoint node of FIGS. 1 and 2.
Figure 5:
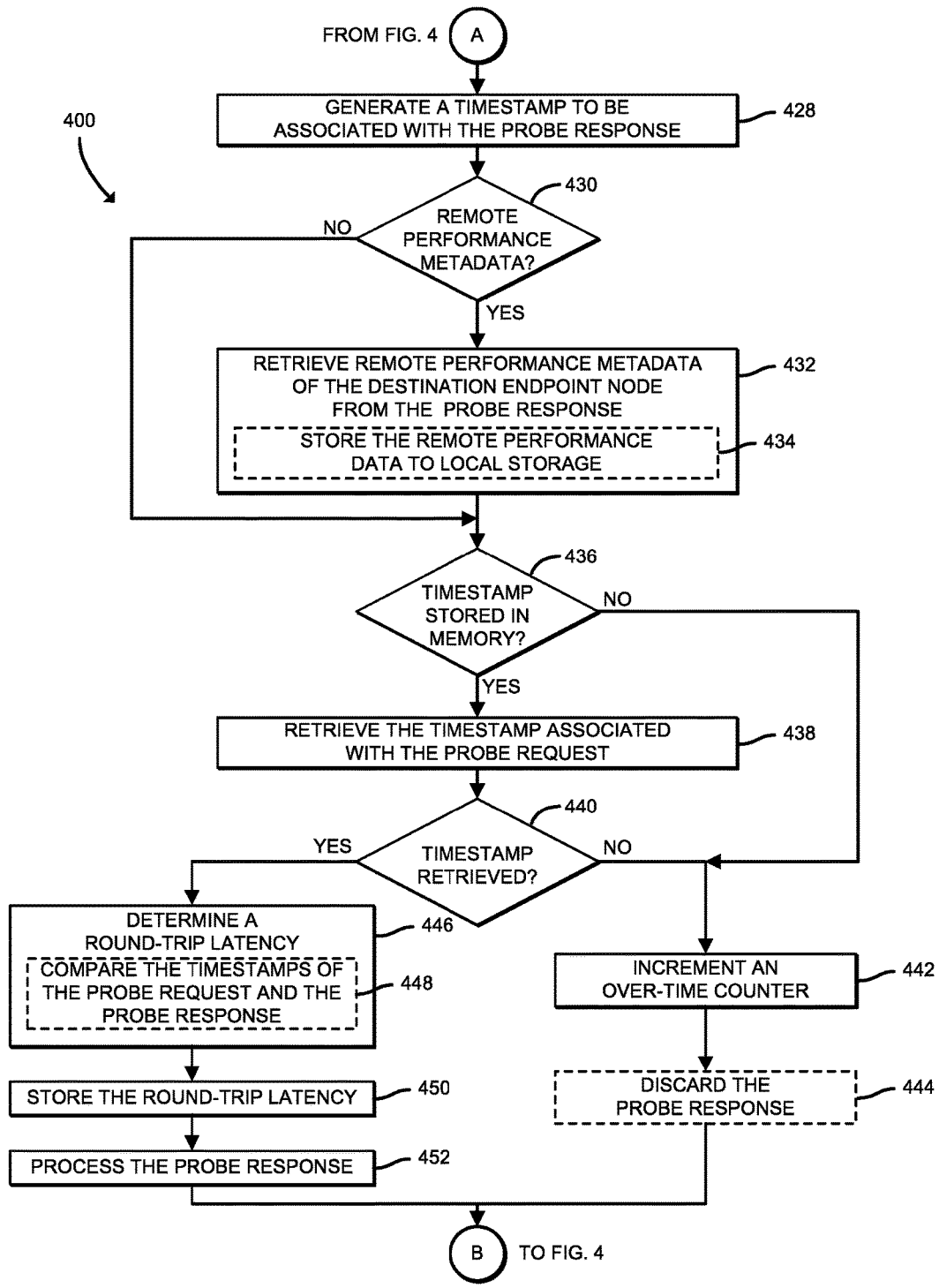

Referring now to FIGS. 4 and 5, in use, the source endpoint node 102 may execute a method 400 for monitoring communication performance of an HPC network (e.g., the HPC network 142). It should be appreciated that at least a portion of the method 400 may be offloaded to and executed by the performance probing engine 118 of the source endpoint node 102. The method 400 begins with block 402, in which the source endpoint node 102 determines whether a probe request was initiated. For example, the probe request may be initiated at the request of an application presently running on the source endpoint node 102, a dynamic runtime system, or automatically by a fabric layer. If the probe request was not initiated, the method 400 loops back to block 402 to continue to determine whether the probe request was initiated. Otherwise, if the probe request was initiated, the method advances to block 404.

In block 404, the source endpoint node 102 generates a probe request. In some embodiments, in block 406, the source endpoint node 102 may generate a network packet that includes the probe request. Alternatively, in some embodiments, in block 408, the source endpoint node 102 may attach, or otherwise include, the probe request to an existing network packet that is to be transmitted by the source endpoint node 102.

In some embodiments, in block 410, the source endpoint node 102 may include local performance metadata of the source endpoint node 102 into the probe request generated at block 404. Additionally or alternatively, in some embodiments, in block 412, the source endpoint node 102 may include a performance metadata request into the probe request that indicates to the receiving endpoint node (e.g., the destination endpoint node 122) to return remote performance data of the receiving endpoint node with the probe response.

In block 414, the source endpoint node 102 generates a timestamp to be associated with the probe request. In some embodiments, in block 416, the source endpoint node 102 additionally generates a unique identifier to be associated with the timestamp. In block 418, the source endpoint node 102 stores the timestamp and/or the unique identifier. In some embodiments, in block 420, the timestamp and/or the unique identifier may be stored at the source endpoint node 102, such as in the cache 106 or the memory 110 of the illustrative source endpoint node 102 of FIG. 1. Alternatively, in some embodiments, in block 422, the source endpoint node 102 may store, or otherwise include, the timestamp and/or the unique identifier in the probe request.

In block 424, the source endpoint node 102 transmits the probe request to the destination endpoint node 122. Subsequently, in block 426, the source endpoint node 102 determines whether a probe response was received from the destination endpoint node 122 in response to the probe request having been received by the destination endpoint node 122. It should be appreciated that not every probe response transmitted to the destination endpoint node 122 will elicit a response from the destination endpoint node 122. For example, fabrics/networks may lose network packets in transmission and, when such an event is encountered the probe request may be lost between the source endpoint node 102 and the destination endpoint node 122 (i.e., lost between source and destination, or vice versa). Accordingly, the source endpoint node 102 may employ various strategies to deal with probe requests that do not result in a response, which may include ignoring the lost probe requests, counting probe requests and probe responses, etc. Such strategies may be used to determine the number of lost probe requests/responses or build on reliability mechanisms that HPC networks 142 may provide for other network packets (e.g., tracking, acknowledging, re-transmitting, etc.). If the probe response was not received from the destination endpoint node 122, the method 400 loops back to block 426 to continue to determine whether the probe response was received. Otherwise, if the probe response was received, the method 400 advances to block 428.

In block 428 (see FIG. 5) the source endpoint node 102 determines whether remote performance data of the destination endpoint node 122 was included with the probe response (e.g., in response to the destination endpoint node 122 having received the performance metadata request with the probe request). If the source endpoint node 102 determines remote performance data of the destination endpoint node 122 was included with the probe response, the method 400 advances to block 432. In block 432, the source endpoint node 102 retrieves the remote performance metadata of the destination endpoint node 122 from the probe response. In some embodiments, in block 434, the source endpoint node 102 additionally stores the remote performance data of the destination endpoint node 122 in local storage of the source endpoint node 102 (e.g., the cache 106 or the memory 110) before advancing to block 436.

If the source endpoint node 102 determines remote performance data of the destination endpoint node 122 was not included with the probe response, the method 400 advances to block 436. In block 436, the source endpoint node 102 determines whether the timestamp is stored in memory (e.g., the cache 106 or the memory 110) of the source endpoint node 102. If not, the method 400 advances to block 442, in which the source endpoint node 102 increments an over-time counter to reflect that the timestamp was no longer in memory during the retrieval attempt. From block 442, in some embodiments, the method 400 proceeds to block 444, in which the source endpoint node 102 may discard, or otherwise drop the probe response before returning to block 402 to determine whether the probe request was initiated again.

If the source endpoint node 102 determines the timestamp is stored in memory at block 436, the method 400 advances to block 438, in which the source endpoint node 102 attempts to retrieve the timestamp. If the timestamp is not retrieved (e.g., was evicted from cache, was stale, etc.), the method advances to block 442 in which the source endpoint node 102 increments the over-time counter. However, if the timestamp was retrieved, the method 400 advances to block 446.

In block 446, the source endpoint node 102 determines a round-trip latency of the probe communication (i.e., the probe request transmitted and the probe response received). To do so, in block 448, the source endpoint node 102 compares the timestamp of the probe request generated at block 414 with the timestamp of the probe response generated at block 428. For example, the probe request generated timestamp may be subtracted from the probe response generated timestamp to return the round-trip latency. In block 450, the source endpoint node 102 stores the round-trip latency with the local performance data.

It should be appreciated that, in some embodiments, an indication may be provided to a monitoring module (e.g., the performance monitoring module 230 of FIG. 2) that indicates the local performance data has been updated to include another round-trip latency. Accordingly, in such embodiments, the monitoring module may generate one or more performance characteristics of the HPC network 142 based on the data contained within the local performance data. It should be further appreciated that, in some embodiments, the monitoring module may further generate one or more performance characteristics of the HPC network 142 based on the remote performance data received from the destination endpoint node 122.

In block 452, the source endpoint node 102 processes the probe response before the method 400 loops back to block 402 to determine whether the probe request was initiated again. In other words, network packet processing software that is capable of processing network packets and changing state of the source endpoint node 102 can be executed to process the probe response. Processing the network packets may include a direct action by hardware of the source endpoint node 102, accumulating information (e.g., a running average) used to guide later action by the hardware, and/or saving the response or some derived result for processing and/or analysis by software of the source endpoint node 102. For example, the source endpoint node 102 may log the data to a pre-reserved memory buffer and, if the memory buffer is determined to have exceeded a threshold, the hardware may signal the software for further processing. In some embodiments, as discussed above, the source endpoint node 102 may perform one or more remedial actions, such as throttle message injection, load balancing across network planes, application-level code updates, and/or other remedial actions to resolve or reduce the congestion.

Figure 6:
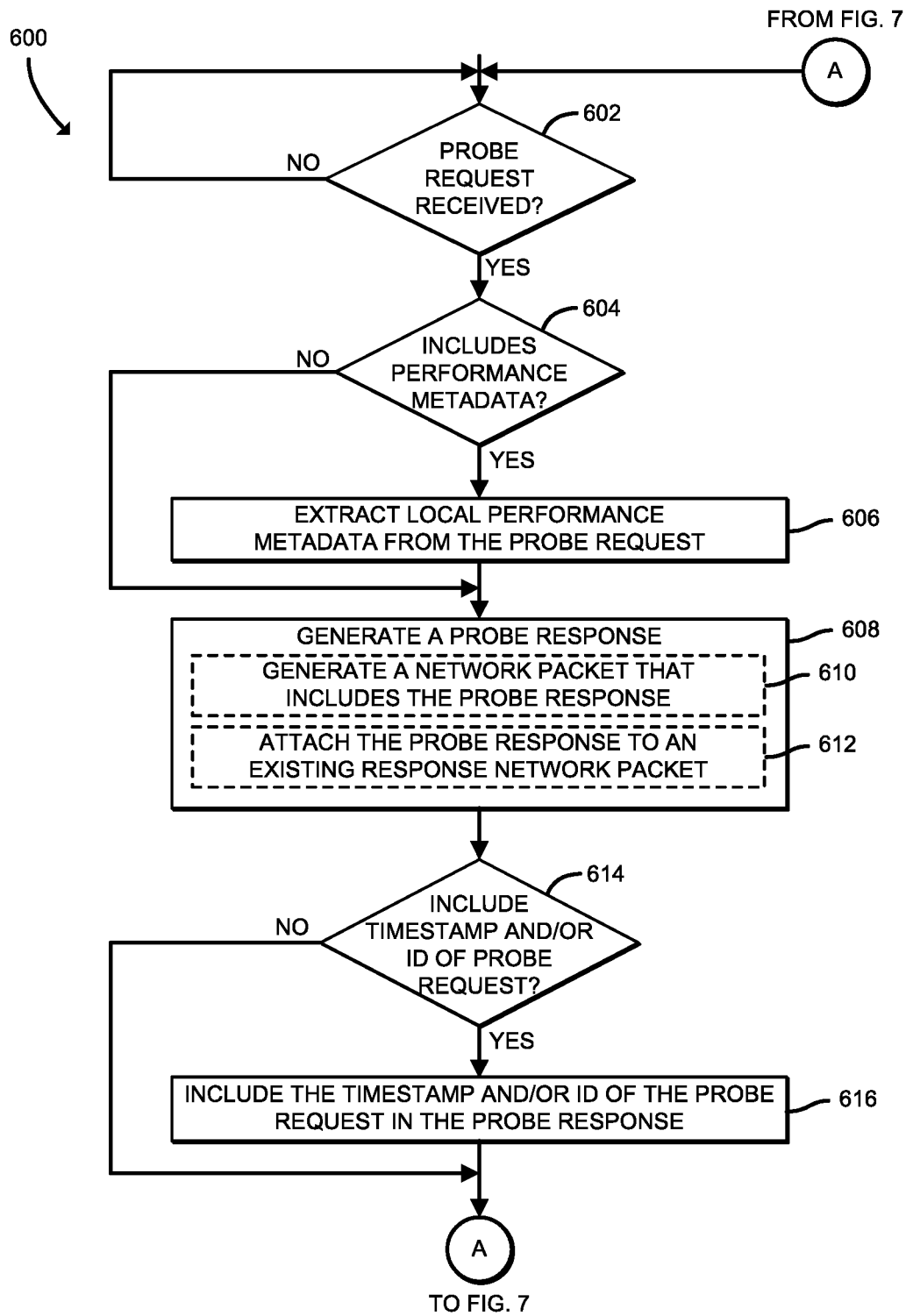
FIGS. 6 and 7 are a simplified flow diagram of at least one embodiment of a method for responding to a probe request that may be executed by the destination endpoint node of FIGS. 1 and 3.
Figure 7:
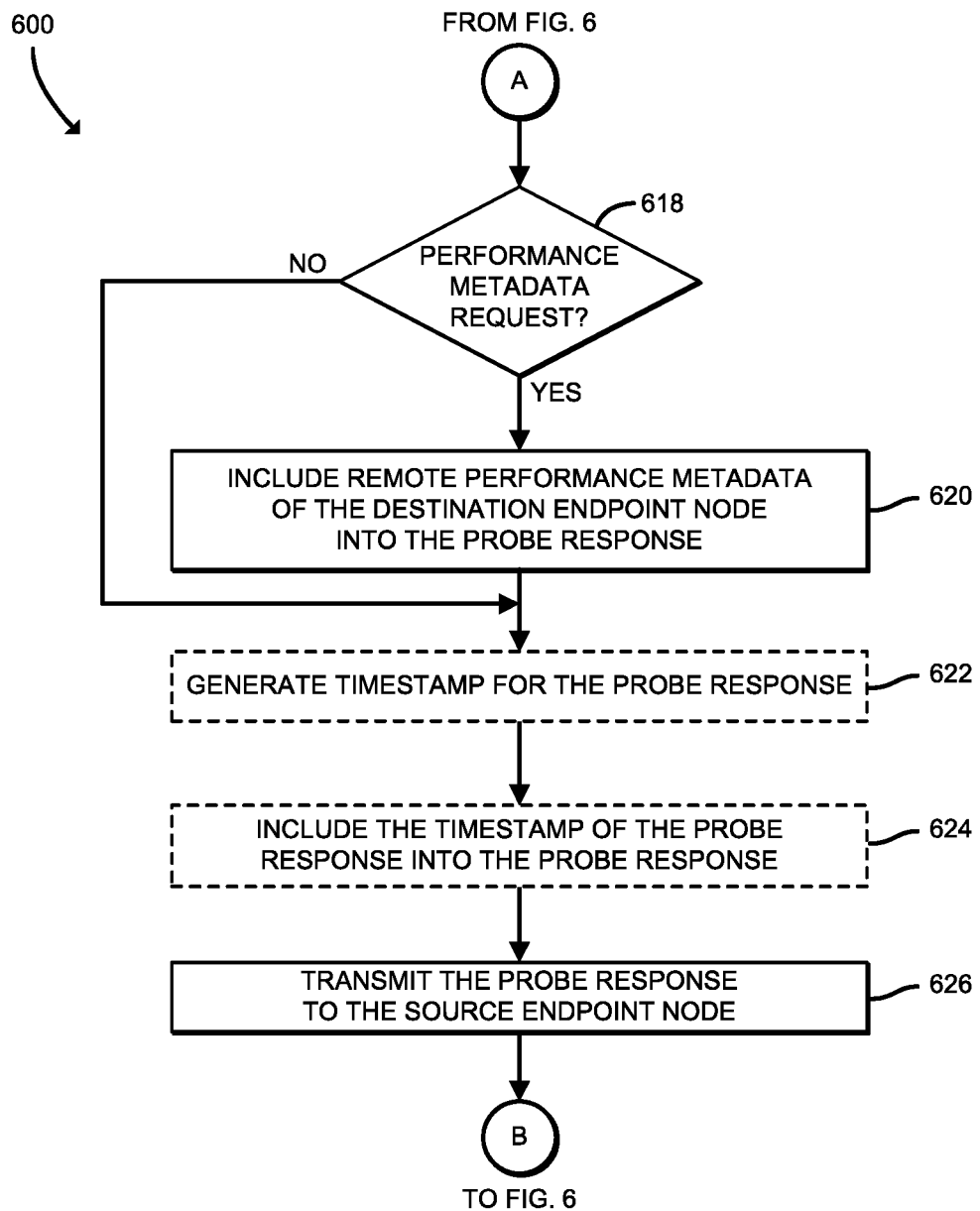

Referring now to FIGS. 6 and 7, in use, the destination endpoint node 122 may execute a method 600 for responding to a probe request used in monitoring communication performance of an HPC network (e.g., the HPC network 142). It should be appreciated that at least a portion of the method 600 may be offloaded to and executed by the performance probing engine 138 of the destination endpoint node 122. The method 600 begins with block 602, in which the destination endpoint node 122 determines whether the probe request was received. If not, the method 600 loops back to block 602 to continue to determine whether the probe request was received. Otherwise, if the probe request was received, the method advances to block 604.

In block 604, the destination endpoint node 122 determines whether the probe request includes local performance data of the source endpoint node 102. If the destination endpoint node 122 determines the probe request does include local performance data of the source endpoint node 102, the method advances to block 606. In block 606, the destination endpoint node 122 extracts the local performance metadata from the probe request before the method advances to block 608, described further below. It should be appreciated that, in some embodiments, the local performance metadata may be stored in local memory (e.g., the memory 130) of the destination endpoint node 122 and/or analyzed to determine one or more performance characteristics of the HPC network 142, which were described previously. Otherwise, if the destination endpoint node 122 determines the probe request does include local performance data of the source endpoint node 102, the method advances to block 608.

In block 608, the destination endpoint node 122 generates a probe response. To do so, in block 610, the destination endpoint node 122 may generate a network packet that includes the probe response. Alternatively, in block 612, the destination endpoint node 122 may attach the probe response to an existing response network packet (e.g., an acknowledgement network packet of the probe request). In block 614, the destination endpoint node 122 determines whether the probe request includes a timestamp of the probe request and/or a unique identifier of the probe request. If not, the method advances to block 618 (see FIG. 7), which is described below. Otherwise, if the probe request includes the timestamp of the probe request and/or the unique identifier of the probe request, the method 600 advances to block 616. In block 616, the destination endpoint node 122 includes the timestamp and/or the unique identifier of the probe request into the probe response before advancing to block 618.

In block 618, the destination endpoint node 122 determines whether the probe request included a performance metadata request (i.e., a request for remote performance metadata of the destination endpoint node 122). If so, the method 600 advances to block 620 to include remote performance metadata of the destination endpoint node 122 before the method proceeds to block 622. Otherwise, if the probe request did not include the performance metadata request, the method advances to block 622. In some embodiments, in block 622, the destination endpoint node 122 may generate a timestamp for the probe response that can be used by the source endpoint node 102 to generate one or more performance characteristics of the HPC network 142 upon receipt of the probe response. Additionally, in such embodiments wherein the timestamp of the probe response was generated at block 622, in block 624, the destination endpoint node 122 may include the timestamp of the probe response into the probe response. In block 626, the destination endpoint node 122 transmits the probe response to the source endpoint node 102 before the method returns to block 602 to determine whether the probe request was received again.

Examples

Illustrative examples of the technologies disclosed herein are provided below. An embodiment of the technologies may include any one or more, and any combination of, the examples described below.

Example 1 includes a source endpoint node of a network to monitor communication performance of the network, the source endpoint node comprising one or more processors; and one or more memory or data storage devices having stored therein a plurality of instructions that, when executed by the one or more processors, cause the source endpoint node to generate a probe request; generate, using a clock of the source endpoint node, a first timestamp; and transmit the probe request to a destination endpoint node of the network communicatively coupled to the source endpoint node via the network; receive, in response to having transmitted the probe request, a probe response from the destination endpoint node via the network; generate, using the clock and in response to having received the probe request, a second timestamp; and determine a round-trip latency as a function of the first and second timestamps.

Example 2 includes the subject matter of Example 1, and wherein the plurality of instructions, when executed by the one or more processors, further cause the source endpoint node to generate an identifier of the probe request; store the identifier of the probe request and the first timestamp as a key-value pair; and retrieve, in response to having received the probe request, the first timestamp associated with the probe request based on the identifier of the probe request.

Example 3 includes the subject matter of any of Examples 1 and 2, and wherein the plurality of instructions, when executed by the one or more processors, further cause the source endpoint node to increment, in response to a determination that the first timestamp was not in the local storage, an over-time counter; and discard the probe response.

Example 4 includes the subject matter of any of Examples 1-3, and wherein to generate the identifier of the probe request comprises to generate an end-to-end reliability sequence number.

Example 5 includes the subject matter of any of Examples 1-4, and wherein the plurality of instructions, when executed by the one or more processors, further cause the source endpoint node to generate an identifier of the probe request, and wherein to transmit the probe request to the destination endpoint node comprises to transmit the probe request including the identifier.

Example 6 includes the subject matter of any of Examples 1-5, and wherein the plurality of instructions, when executed by the one or more processors, further cause the source endpoint node to include the first timestamp into the probe request, wherein to transmit the probe request to the destination endpoint node of the network comprises to transmit the probe request with the first timestamp, and wherein to receive the probe response from the destination endpoint node comprises to receive the probe response from the destination endpoint node that includes the first timestamp.

Example 7 includes the subject matter of any of Examples 1-6, and wherein the plurality of instructions, when executed by the one or more processors, further cause the source endpoint node to retrieve, in response to having received the probe request that includes the first timestamp, the first timestamp associated with the probe request from the probe response.

Example 8 includes the subject matter of any of Examples 1-7, and wherein to determine the round-trip latency as a function of the first and second timestamps comprises to subtract the first timestamp from the second timestamp.

Example 9 includes the subject matter of any of Examples 1-8, and wherein the plurality of instructions, when executed by the one or more processors, further cause the source endpoint node to include a request for remote performance metadata of the destination endpoint node into the probe request, and wherein to receive the probe response from the destination endpoint node includes to receive remote performance metadata of the destination endpoint node.

Example 10 includes the subject matter of any of Examples 1-9, and wherein the plurality of instructions, when executed by the one or more processors, further cause the source endpoint node to determine one or more performance characteristics of the network as a function of the remote performance metadata.

Example 11 includes the subject matter of any of Examples 1-10, and, wherein the plurality of instructions, when executed by the one or more processors, further cause the source endpoint node to determine a remedial action in response to a determination that a performance characteristic of the network is indicative of a degradation of a performance level of the network.

Example 12 includes the subject matter of any of Examples 1-11, and wherein the plurality of instructions, when executed by the one or more processors, further cause the source endpoint node to retrieve local performance metadata of the source endpoint node; and include the local performance metadata in the probe request, wherein the local performance metadata is usable by the destination endpoint node to determine a performance characteristic of the network.

Example 13 includes the subject matter of any of Examples 1-12, and wherein to transmit the probe request to the destination endpoint node comprises to transmit the probe request including the first timestamp.

Example 14 includes the subject matter of any of Examples 1-13, and wherein to transmit the probe request to the destination endpoint node comprises to (i) include the probe request into an outgoing data packet and (ii) transmit the outgoing data packet including the probe request.

Example 15 includes a method for monitoring communication performance of a network, the method comprising generating, by a performance probing engine of a source endpoint node of the network, a probe request; generating, by the performance probing engine using a clock of the source endpoint node, a first timestamp; transmitting, by the source endpoint node, the probe request to a destination endpoint node of the network communicatively coupled to the source endpoint node via the network; receiving, by the source endpoint node and in response to transmitting the probe request, a probe response from the destination endpoint node via the network; generating, by the performance probing engine using the clock and in response to receiving the probe request, a second timestamp; and determining, by the performance probing engine, a round-trip latency as a function of the first and second timestamps.

Example 16 includes the subject matter of Example 15, and further including generating, by the performance probing engine, an identifier of the probe request; storing, by the source endpoint node, the identifier of the probe request and the first timestamp as a key-value pair; and retrieving, by the source endpoint node and in response to receiving the probe request, the first timestamp associated with the probe request based on the identifier of the probe request.

Example 17 includes the subject matter of any of Examples 15 and 16, and further including, in response to a determination that the first timestamp was not in the local storage incrementing an over-time counter; and discarding the probe response.

Example 18 includes the subject matter of any of Examples 15-17, and wherein generating the identifier of the probe request comprises generating an end-to-end reliability sequence number.

Example 19 includes the subject matter of any of Examples 15-18, and further including generating, by the performance probing engine, an identifier of the probe request, wherein transmitting the probe request to the destination endpoint node comprises transmitting the probe request including the identifier.

Example 20 includes the subject matter of any of Examples 15-19, and further including the first timestamp into the probe request, wherein transmitting the probe request to the destination endpoint node of the network comprises transmitting the probe request with the first timestamp, and wherein receiving the probe response from the destination endpoint node comprises receiving the probe response from the destination endpoint node that includes the first timestamp.

Example 21 includes the subject matter of any of Examples 15-20, and further including retrieving, by the source endpoint node and in response to receiving the probe request that includes the first timestamp, the first timestamp associated with the probe request from the probe response.

Example 22 includes the subject matter of any of Examples 15-21, and wherein determining the round-trip latency as a function of the first and second timestamps comprises subtracting the first timestamp from the second timestamp.

Example 23 includes the subject matter of any of Examples 15-22, and further including a request for remote performance metadata of the destination endpoint node into the probe request, wherein receiving the probe response from the destination endpoint node includes receiving remote performance metadata of the destination endpoint node.

Example 24 includes the subject matter of any of Examples 15-23, and further including determining, by the source endpoint node, one or more performance characteristics of the network as a function of the remote performance metadata.

Example 25 includes the subject matter of any of Examples 15-24, and further including determining, by the source endpoint node, a remedial action in response to a determination that a performance characteristic of the network is indicative of a degradation of a performance level of the network.

Example 26 includes the subject matter of any of Examples 15-25, and further including retrieving local performance metadata of the source endpoint node; and including the local performance metadata in the probe request, wherein the local performance metadata is usable by the destination endpoint node to determine a performance characteristic of the network.

Example 27 includes the subject matter of any of Examples 15-26, and wherein transmitting the probe request to the destination endpoint node comprises transmitting the probe request including the first timestamp.

Example 28 includes the subject matter of any of Examples 15-27, and wherein transmitting the probe request to the destination endpoint node comprises (i) including the probe request into an outgoing data packet and (ii) transmitting the outgoing data packet including the probe request.

Example 29 includes a computing device comprising a processor; and a memory having stored therein a plurality of instructions that when executed by the processor cause the computing device to perform the method of any of Examples 15-28.

Example 30 includes one or more machine readable storage media comprising a plurality of instructions stored thereon that in response to being executed result in a computing device performing the method of any of Examples 15-28.

Example 31 includes a source endpoint node of a network to monitor communication performance of the network, the source endpoint node comprising a performance probing engine to (i) generate a probe request and (ii) generate, using a clock of the source endpoint node, a first timestamp; and network communication circuitry to (i) transmit the probe request to a destination endpoint node of the network communicatively coupled to the source endpoint node via the network and (ii) receive, in response to having transmitted the probe request, a probe response from the destination endpoint node via the network; wherein the performance probing engine is further to (i) generate, using the clock and in response to having received the probe request, a second timestamp and (ii) determine a round-trip latency as a function of the first and second timestamps.

Example 32 includes the subject matter of Example 31, and wherein the performance probing engine is further to (i) generate an identifier of the probe request, (ii) store the identifier of the probe request and the first timestamp as a key-value pair, and (iii) retrieve, in response to having received the probe request, the first timestamp associated with the probe request based on the identifier of the probe request.

Example 33 includes the subject matter of any of Examples 31 and 32, and wherein the performance probing engine is further to, in response to a determination that the first timestamp was not in the local storage, (i) increment an over-time counter and (ii) discard the probe response.

Example 34 includes the subject matter of any of Examples 31-33, and wherein to generate the identifier of the probe request comprises to generate an end-to-end reliability sequence number.

Example 35 includes the subject matter of any of Examples 31-34, and wherein the performance probing engine is further to generate an identifier of the probe request, wherein to transmit the probe request to the destination endpoint node comprises to transmit the probe request including the identifier.

Example 36 includes the subject matter of any of Examples 31-35, and wherein the performance probing engine is further to include the first timestamp into the probe request, wherein to transmit the probe request to the destination endpoint node of the network comprises to transmit the probe request with the first timestamp, and wherein to receive the probe response from the destination endpoint node comprises to receive the probe response from the destination endpoint node that includes the first timestamp.

Example 37 includes the subject matter of any of Examples 31-36, and wherein the performance probing engine is further to retrieve, in response to having received the probe request that includes the first timestamp, the first timestamp associated with the probe request from the probe response.

Example 38 includes the subject matter of any of Examples 59-37, and wherein to determine the round-trip latency as a function of the first and second timestamps comprises to subtract the first timestamp from the second timestamp.

Example 39 includes the subject matter of any of Examples 31-38, and wherein the performance probing engine is further to include a request for remote performance metadata of the destination endpoint node into the probe request, wherein to receive the probe response from the destination endpoint node includes to receive remote performance metadata of the destination endpoint node.

Example 40 includes the subject matter of any of Examples 31-39, and further including performance monitoring circuitry to determine one or more performance characteristics of the network as a function of the remote performance metadata.

Example 41 includes the subject matter of any of Examples 59-40, and wherein the performance monitoring circuitry is further to determine a remedial action in response to a determination that a performance characteristic of the network is indicative of a degradation of a performance level of the network.

Example 42 includes the subject matter of any of Examples 31-41, and wherein the performance probing engine is further to (i) retrieve local performance metadata of the source endpoint node and (ii) include the local performance metadata in the probe request, wherein the local performance metadata is usable by the destination endpoint node to determine a performance characteristic of the network.

Example 43 includes the subject matter of any of Examples 31-42, and wherein to transmit the probe request to the destination endpoint node comprises to transmit the probe request including the first timestamp.

Example 44 includes the subject matter of any of Examples 31-43, and wherein to transmit the probe request to the destination endpoint node comprises to (i) include the probe request into an outgoing data packet and (ii) transmit the outgoing data packet including the probe request.

Example 45 includes a source endpoint node of the network to monitor communication performance of the network, the source endpoint node comprising means for generating a probe request; means for generating a first timestamp; means for transmitting the probe request to a destination endpoint node of the network communicatively coupled to the source endpoint node via the network; means for receiving, in response to transmitting the probe request, a probe response from the destination endpoint node via the network; means for generating, in response to receiving the probe request, a second timestamp; and means for determining a round-trip latency as a function of the first and second timestamps.

Example 46 includes the subject matter of Example 45, and further including means for generating an identifier of the probe request; means for storing the identifier of the probe request and the first timestamp as a key-value pair; and means for retrieving, in response to receiving the probe request, the first timestamp associated with the probe request based on the identifier of the probe request.

Example 47 includes the subject matter of any of Examples 45 and 46, and further including, in response to a determination that the first timestamp was not in the local storage means for incrementing an over-time counter; and means for discarding the probe response.

Example 48 includes the subject matter of any of Examples 45-47, and wherein the means for generating the identifier of the probe request comprises means for generating an end-to-end reliability sequence number.

Example 49 includes the subject matter of any of Examples 45-48, and further the means for comprising generating, an identifier of the probe request, wherein the means for transmitting the probe request to the destination endpoint node comprises means for transmitting the probe request including the identifier.

Example 50 includes the subject matter of any of Examples 45-49, and further including means for including the first timestamp into the probe request, wherein the means for transmitting the probe request to the destination endpoint node of the network comprises means for transmitting the probe request with the first timestamp, and wherein the means for receiving the probe response from the destination endpoint node comprises means for receiving the probe response from the destination endpoint node that includes the first timestamp.

Example 51 includes the subject matter of any of Examples 45-50, and further including means for retrieving, in response to receiving the probe request that includes the first timestamp, the first timestamp associated with the probe request from the probe response.

Example 52 includes the subject matter of any of Examples 45-51, and wherein the means for determining the round-trip latency as a function of the first and second timestamps comprises means for subtracting the first timestamp from the second timestamp.

Example 53 includes the subject matter of any of Examples 45-52, and further including means for including a request for remote performance metadata of the destination endpoint node into the probe request, wherein the means for receiving the probe response from the destination endpoint node includes means for receiving remote performance metadata of the destination endpoint node.

Example 54 includes the subject matter of any of Examples 45-53, and further including means for determining one or more performance characteristics of the network as a function of the remote performance metadata.

Example 55 includes the subject matter of any of Examples 45-54, and further including means for determining a remedial action in response to a determination that a performance characteristic of the network is indicative of a degradation of a performance level of the network.

Example 56 includes the subject matter of any of Examples 45-55, and wherein the remedial actions include at least one of temporarily throttling message injection to an endpoint node, load balancing across network planes, and performing application-level code updates.

Example 57 includes the subject matter of any of Examples 45-56, and further including means for retrieving local performance metadata of the source endpoint node; and means for including the local performance metadata in the probe request, wherein the local performance metadata is usable by the destination endpoint node to determine a performance characteristic of the network.

Example 58 includes the subject matter of any of Examples 45-57, and wherein the means for transmitting the probe request to the destination endpoint node comprises means for transmitting the probe request including the first timestamp.

Example 59 includes the subject matter of any of Examples 45-58, and wherein the means for transmitting the probe request to the destination endpoint node comprises means for (i) including the probe request into an outgoing data packet and (ii) transmitting the outgoing data packet including the probe request.

Example 60 includes a destination endpoint node of a network to monitor communication performance of the network, the destination endpoint node comprising one or more processors; and one or more memory or storage devices having stored therein a plurality of instructions that, when executed by the one or more processors, cause the destination endpoint node to receive a probe request from a source endpoint node of the network communicatively coupled to the destination endpoint node via the network, wherein the probe request includes an identifier of the probe request; generate, by a performance probing engine of the destination endpoint node and in response to having received the probe request, a probe response that includes the identifier of the probe request; generate a timestamp for the probe response; include the timestamp of the probe response into the probe; and transmit the probe response to the source endpoint node.

Example 61 includes the subject matter of Example 60, and wherein the plurality of instructions, when executed by the one or more processors, cause the destination endpoint node to determine whether the probe request includes local performance data of the source endpoint node; extract the local performance data of the source endpoint node from the probe request in response to a determination that the probe request includes the local performance data; and determine one or more performance characteristics of the network as a function of the local performance data.

Example 62 includes the subject matter of any of Examples 60 and 61, and wherein the plurality of instructions, when executed by the one or more processors, cause the destination endpoint node to include remote performance metadata of the destination endpoint node in response to a determination that the probe response includes a performance metadata request, wherein the remote performance metadata of the destination endpoint node is usable to determine one or more performance characteristics of the network.

Example 63 includes the subject matter of any of Examples 60-62, and wherein the plurality of instructions, when executed by the one or more processors, cause the destination endpoint node to include a timestamp of the probe request into the probe response, in response to a determination that the probe request included the timestamp.

Example 64 includes the subject matter of any of Examples 60-63, and wherein to generate the probe response comprises to generate a network packet that includes the probe response.

Example 65 includes the subject matter of any of Examples 60-64, and wherein to generate the probe response comprises to attach the probe response to an existing response network packet.

Example 66 includes a method for monitoring communication performance of a network, the method comprising receiving, by a destination endpoint node of the network, a probe request from a source endpoint node of the network communicatively coupled to the destination endpoint node via the network, wherein the probe request includes an identifier of the probe request; generating, by a performance probing engine of the destination endpoint node and in response to receiving the probe request, a probe response that includes the identifier of the probe request; generating, by the performance probing engine, a timestamp for the probe response; including, by the performance probing engine, the timestamp of the probe response into the probe; and transmitting, by the destination endpoint node, the probe response to the source endpoint node.

Example 67 includes the subject matter of Example 66, and further including determining whether the probe request includes local performance data of the source endpoint node; extracting the local performance data of the source endpoint node from the probe request in response to a determination that the probe request includes the local performance data; and determining one or more performance characteristics of the network as a function of the local performance data.

Example 68 includes the subject matter of any of Examples 66 and 67, and further including remote performance metadata of the destination endpoint node in response to a determination that the probe response includes a performance metadata request, wherein the remote performance metadata of the destination endpoint node is usable to determine one or more performance characteristics of the network.

Example 69 includes the subject matter of any of Examples 66-68, and further including a timestamp of the probe request into the probe response, in response to a determination that the probe request included the timestamp.

Example 70 includes the subject matter of any of Examples 66-69, and wherein generating the probe response comprises generating a network packet that includes the probe response.

Example 71 includes the subject matter of any of Examples 66-70, and wherein generating the probe response comprises attaching the probe response to an existing response network packet.

Example 72 includes a computing device comprising a processor; and a memory having stored therein a plurality of instructions that when executed by the processor cause the computing device to perform the method of any of Examples 66-71.

Example 73 includes one or more machine readable storage media comprising a plurality of instructions stored thereon that in response to being executed result in a computing device performing the method of any of Examples 66-71.

Example 74 includes a destination endpoint node of a network to monitor communication performance of the network, the destination endpoint node comprising network communication circuitry to receive a probe request from a source endpoint node of the network communicatively coupled to the destination endpoint node via the network, wherein the probe request includes an identifier of the probe request; and a performance probing engine to (i) generate, in response to having received the probe request, a probe response that includes the identifier of the probe request, (ii) generate a timestamp for the probe response, and (iii) include the timestamp of the probe response into the probe, wherein the network communication circuitry is further to transmit the probe response to the source endpoint node.

Example 75 includes the subject matter of Example 74, and wherein the performance probing engine is further to (i) determine whether the probe request includes local performance data of the source endpoint node, (ii) extract the local performance data of the source endpoint node from the probe request in response to a determination that the probe request includes the local performance data, and (iii) determine one or more performance characteristics of the network as a function of the local performance data.

Example 76 includes the subject matter of any of Examples 74 and 75, and wherein the performance probing engine is further to include remote performance metadata of the destination endpoint node in response to a determination that the probe response includes a performance metadata request, wherein the remote performance metadata of the destination endpoint node is usable to determine one or more performance characteristics of the network.

Example 77 includes the subject matter of any of Examples 74-76, and wherein the performance probing engine is further to include a timestamp of the probe request into the probe response, in response to a determination that the probe request included the timestamp.

Example 78 includes the subject matter of any of Examples 74-77, and wherein to generate the probe response comprises to generate a network packet that includes the probe response.

Example 79 includes the subject matter of any of Examples 74-78, and wherein to generate the probe response comprises to attach the probe response to an existing response network packet.

Example 80 includes A destination endpoint node of a network to monitor communication performance of the network, the destination endpoint node comprising means for receiving, by a destination endpoint node of the network, a probe request from a source endpoint node of the network communicatively coupled to the destination endpoint node via the network, wherein the probe request includes an identifier of the probe request; means for generating, by a performance probing engine of the destination endpoint node and in response to receiving the probe request, a probe response that includes the identifier of the probe request; means for generating a timestamp for the probe response; means for including the timestamp of the probe response into the probe; and means for transmitting the probe response to the source endpoint node.

Example 81 includes the subject matter of Example 80, and further including means for determining whether the probe request includes local performance data of the source endpoint node; means for extracting the local performance data of the source endpoint node from the probe request in response to a determination that the probe request includes the local performance data; and means for determining one or more performance characteristics of the network as a function of the local performance data.

Example 82 includes the subject matter of any of Examples 80 and 81, and further including means for including remote performance metadata of the destination endpoint node in response to a determination that the probe response includes a performance metadata request, wherein the remote performance metadata of the destination endpoint node is usable to determine one or more performance characteristics of the network.

Example 83 includes the subject matter of any of Examples 80-82, and further including means for including a timestamp of the probe request into the probe response, in response to a determination that the probe request included the timestamp.

Example 84 includes the subject matter of any of Examples 80-83, and wherein the means for generating the probe response comprises means for generating a network packet that includes the probe response.

Example 85 includes the subject matter of any of Examples 80-84, and wherein the means for generating the probe response comprises means for attaching the probe response to an existing response network packet.

The invention claimed is:

1. A source endpoint node of a network to monitor communication performance of the network, the source endpoint node comprising:
one or more processors; and
one or more memory or data storage devices having stored therein a plurality of instructions that, when executed by the one or more processors, cause the source endpoint node to:
generate a probe request and an identifier of the probe request, wherein the probe request includes performance metadata of the source endpoint node, and wherein the performance metadata indicates at least one of power consumption, bandwidth, throughput, or latency of the source endpoint node;
generate, using a clock of the source endpoint node, a first timestamp;
store the identifier of the probe request and the first timestamp as a key-value pair in a local storage of the source endpoint node; transmit the probe request to a destination endpoint node of the network communicatively coupled to the source endpoint node via the network;
receive, in response to having transmitted the probe request, a probe response from the destination endpoint node via the network;
generate, using the clock and in response to having received the probe request, a second timestamp;
determine a round-trip latency as a function of the first and second timestamps; determine that the round-trip latency is indicative of a degradation in a performance level of the network;
increment, in response to a determination that the identifier is no longer in the local storage, an over-time counter;
determine one or more points of congestion in the network based on a plurality of historical values associated with the over-time counter; and
perform a remedial action in response to the determination that the round-trip latency is indicative of the degradation in the performance level of the network.

2. The source endpoint node of claim 1,
wherein to transmit the probe request includes to transmit the identifier with the probe request, wherein to receive the probe response includes to receive the identifier with the probe response, and wherein to determine the round-trip latency as a function of the first and second timestamps includes to retrieve the first timestamp associated with the probe request based on the identifier of the probe request.

3. The source endpoint node of claim 2, wherein the plurality of instructions, when executed by the one or more processors, further cause the source endpoint node to:
discard the probe response.

4. The source endpoint node of claim 1, wherein the plurality of instructions, when executed by the one or more processors, further cause the source endpoint node to include the first timestamp into the probe request, wherein to transmit the probe request to the destination endpoint node of the network comprises to transmit the probe request with the first timestamp, and wherein to receive the probe response from the destination endpoint node comprises to receive the probe response from the destination endpoint node that includes the first timestamp.

5. The source endpoint node of claim 1, wherein the plurality of instructions, when executed by the one or more processors, further cause the source endpoint node to include a request for remote performance metadata of the destination endpoint node into the probe request, and wherein to receive the probe response from the destination endpoint node includes to receive remote performance metadata of the destination endpoint node.

6. The source endpoint node of claim 5, wherein the plurality of instructions, when executed by the one or more processors, further cause the source endpoint node to determine one or more performance characteristics of the network as a function of the remote performance metadata.

7. The source endpoint node of claim 6, wherein the remedial action is performed in response to a further determination that a performance characteristic of the network is indicative of the degradation in the performance level of the network.

8. The source endpoint node of claim 1, wherein the plurality of instructions, when executed by the one or more processors, further cause the source endpoint node to:
retrieve the performance metadata of the source endpoint node, wherein the performance metadata of the source endpoint node is usable by the destination endpoint node to determine a performance characteristic of the network.

9. The source endpoint node of claim 1, wherein to transmit the probe request to the destination endpoint node comprises to (i) include the probe request into an outgoing data packet and (ii) transmit the outgoing data packet including the probe request.

10. One or more non-transitory computer-readable storage media comprising a plurality of instructions stored thereon that in response to being executed cause a source endpoint node to:
generate a probe request and an identifier of the probe request, wherein the probe request includes performance metadata of the source endpoint node, and wherein the performance metadata indicates at least one of power consumption, bandwidth, throughput, or latency of the source endpoint node;
generate, using a clock of the source endpoint node, a first timestamp;
store the identifier of the probe request and the first timestamp as a key-value pair in a local storage of the source endpoint node;
transmit the probe request to a destination endpoint node of the network communicatively coupled to the source endpoint node via the network;
receive, in response to having transmitted the probe request, a probe response from the destination endpoint node via the network;
generate, using the clock and in response to having received the probe request, a second timestamp;
determine a round-trip latency as a function of the first and second timestamps;
determine that the round-trip latency is indicative of a degradation in a performance level of the network;
increment, in response to a determination that the identifier is no longer in the local storage, an over-time counter;
determine one or more points of congestion in the network based on a plurality of historical values associated with the over-time counter; and
perform a remedial action in response to the determination that the round-trip latency is indicative of the degradation in the performance level of the network.

11. The one or more non-transitory computer-readable storage media of claim 10, wherein to transmit the probe request includes to transmit the identifier with the probe request, wherein receiving the probe response includes receiving the identifier with the probe response, and wherein to determine the round-trip latency as a function of the first and second timestamps includes retrieving the first timestamp associated with the probe request based on the identifier of the probe request.

12. The one or more non-transitory computer-readable storage media of claim 11, further comprising a plurality of instructions that in response to being executed cause the source endpoint node to: discard the probe response.

13. The one or more non-transitory computer-readable storage media of claim 10, further comprising a plurality of instructions that in response to being executed cause the source endpoint node to include the first timestamp into the probe request, wherein to transmit the probe request to the destination endpoint node of the network comprises to transmit the probe request with the first timestamp, and wherein to receive the probe response from the destination endpoint node comprises to receive the probe response from the destination endpoint node that includes the first timestamp.

14. The one or more non-transitory computer-readable storage media of claim 10, further comprising a plurality of instructions that in response to being executed cause the source endpoint node to include a request for remote performance metadata of the destination endpoint node into the probe request, and wherein to receive the probe response from the destination endpoint node includes to receive remote performance metadata of the destination endpoint node.

15. The one or more non-transitory computer-readable storage media of claim 14, further comprising a plurality of instructions that in response to being executed cause the source endpoint node to determine one or more performance characteristics of the network as a function of the remote performance metadata.

16. The one or more non-transitory computer-readable storage media of claim 15, wherein the remedial action is performed in response to a further determination that a performance characteristic of the network is indicative of the degradation in the performance level of the network.

17. The one or more non-transitory computer-readable storage media of claim 10, further comprising a plurality of instructions that in response to being executed cause the source endpoint node to: retrieve the performance metadata of the source endpoint node, wherein the performance metadata of the source endpoint node is usable by the destination endpoint node to determine a performance characteristic of the network.

18. The one or more non-transitory computer-readable storage media of claim 10, wherein to transmit the probe request to the destination endpoint node comprises to (i) include the probe request into an outgoing data packet and (ii) transmit the outgoing data packet including the probe request.

19. A method for monitoring communication performance of a network, the method comprising:
generating, by a performance probing engine of a source endpoint node of the network, a probe request and an identifier for the probe request, wherein the probe request includes performance metadata of the source endpoint node, and wherein the performance metadata indicates at least one of power consumption, bandwidth, throughput, or latency of the source endpoint node;
generating, by the performance probing engine using a clock of the source endpoint node, a first timestamp;
storing the identifier of the probe request and the first timestamp as a key-value pair in a local storage of the source endpoint node transmitting, by the source endpoint node, the probe request to a destination endpoint node of the network communicatively coupled to the source endpoint node via the network;

receiving, by the source endpoint node and in response to transmitting the probe request, a probe response from the destination endpoint node via the network;

generating, by the performance probing engine using the clock and in response to receiving the probe request, a second timestamp;

determining, by the performance probing engine, a round-trip latency as a function of the first and second timestamps;

determining, by the source endpoint node, that the round-trip latency is indicative of a degradation in a performance level of the network;

incrementing, in response to a determination that the identifier is no longer in the local storage, an over-time counter;

determining one or more points of congestion in the network based on a plurality of historical values associated with the over-time counter; and performing, by the source endpoint node, a remedial action in response to the determination that the round-trip latency is indicative of the degradation in the performance level of the network.

20. The method of claim 19, wherein transmitting the probe request includes transmitting the identifier with the probe request, wherein receiving the probe response includes receiving the identifier with the probe response, and wherein determining the round-trip latency as a function of the first and second timestamps includes retrieving the first timestamp associated with the probe request based on the identifier of the probe request.

21. The method of claim 20, further comprising, discarding the probe response.

22. The method of claim 19, further comprising including the first timestamp into the probe request, wherein transmitting the probe request to the destination endpoint node of the network comprises transmitting the probe request with the first timestamp, and wherein receiving the probe response from the destination endpoint node comprises receiving the probe response from the destination endpoint node that includes the first timestamp.

23. The method of claim 19, further comprising:

including a request for remote performance metadata of the destination endpoint node into the probe request, wherein receiving the probe response from the destination endpoint node includes receiving remote performance metadata of the destination endpoint node; and determining, by the source endpoint node, one or more performance characteristics of the network as a function of the remote performance metadata, wherein the remedial action is performed in response to a further determination that a performance characteristic of the network is indicative of the degradation in the performance level of the network.

24. A source endpoint node of a network to monitor communication performance of the network, the source endpoint node comprising:

means for generating a probe request and an identifier, wherein the probe request includes performance metadata of the source endpoint node, the performance metadata indicating at least one of power consumption, bandwidth, throughput, and latency of the source endpoint node;

means for generating a first timestamp;

network communication circuitry to (i) store the identifier of the probe request and the first timestamp as a key-value pair in a local storage of the source endpoint node, (ii) transmit the probe request to a destination endpoint node of the network communicatively coupled to the source endpoint node via the network, and (iii) receive, in response to transmitting the probe request, a probe response from the destination endpoint node via the network;

means for generating, in response to receiving the probe request, a second timestamp;

means for determining a round-trip latency as a function of the first and second timestamps;

means for determining that the round-trip latency is indicative of a degradation in a performance level of the network;

means for incrementing, in response to a determination that the identifier is no longer in the local storage, an over-time counter; means for determining one or more points of congestion in the network based on a plurality of historical values associated with the over-time counter; and means for performing a remedial action in response to the determination that the round-trip latency is indicative of the degradation in the performance level of the network.

25. The source endpoint node of claim 24, further comprising:

means for retrieving, in response to receiving the probe request, the first timestamp associated with the probe request based on the identifier of the probe request.

* * * * *